US012579295B2

(12) United States Patent
Cohen et al.

(10) Patent No.: US 12,579,295 B2
(45) Date of Patent: Mar. 17, 2026

(54) SYSTEMS AND METHODS FOR ELECTRONIC DEVICE ACCESS

(71) Applicant: Apple Inc., Cupertino, CA (US)

(72) Inventors: David Cohen, Longmont, CO (US); Aakriti Mittal, Campbell, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 18/611,431

(22) Filed: Mar. 20, 2024

(65) Prior Publication Data

US 2024/0330498 A1     Oct. 3, 2024

Related U.S. Application Data

(60) Provisional application No. 63/616,463, filed on Dec. 29, 2023, provisional application No. 63/493,293, filed on Mar. 30, 2023.

(51) Int. Cl.
G06F 21/62          (2013.01)

(52) U.S. Cl.
CPC ................................ G06F 21/6218 (2013.01)

(58) Field of Classification Search
None
See application file for complete search history.

(56) References Cited

U.S. PATENT DOCUMENTS

| 7,725,716 B2 | 5/2010 | Tidwell et al. |
| 9,137,014 B2 | 9/2015 | Herbach et al. |

| 9,740,832 B2 | 8/2017 | Shi |
| 9,977,496 B2 | 5/2018 | Maltz |
| 10,509,463 B2 | 12/2019 | Cuervo et al. |
| 10,698,743 B2 | 6/2020 | Studnicka |
| 10,783,269 B1 | 9/2020 | Shraer et al. |
| 11,177,836 B1 | 11/2021 | Thantharate et al. |
| 11,334,157 B1 | 5/2022 | Gong et al. |
| 11,348,369 B2 | 5/2022 | Wu et al. |
| 11,678,016 B1 | 6/2023 | Antony et al. |
| 11,884,235 B2 | 1/2024 | Bielby |
| 12,058,301 B2 | 8/2024 | Jansen Dos Reis |
| 2007/0220009 A1 | 9/2007 | Morris et al. |
| 2010/0214243 A1 | 8/2010 | Birnbaum et al. |
| 2011/0276803 A1 | 11/2011 | Bender et al. |
| 2013/0305354 A1 | 11/2013 | King et al. |
| 2014/0089278 A1 | 3/2014 | Lovinger et al. |

(Continued)

FOREIGN PATENT DOCUMENTS

| CN | 111385627 B | 12/2022 |
| KR | 102668753 B1 | 5/2024 |

(Continued)

OTHER PUBLICATIONS

Non-Final Office Action received for U.S. Appl. No. 18/353,038, mailed on Mar. 27, 2025, 12 pages.

(Continued)

*Primary Examiner* — Brandon Hoffman
(74) *Attorney, Agent, or Firm* — Kubota & Basol LLP

(57)          ABSTRACT

A first user of an electronic device operates the electronic device in a first mode with access to a plurality of features. The first user optionally configures the electronic device to provide permission for another user to use the electronic device in a second mode with access to a subset of the plurality of features.

17 Claims, 3 Drawing Sheets

(56) References Cited

U.S. PATENT DOCUMENTS

| | | |
|---|---|---|
| 2014/0283012 A1 | 9/2014 | Eggerton et al. |
| 2015/0079933 A1 | 3/2015 | Smith et al. |
| 2015/0113631 A1 | 4/2015 | Lerner et al. |
| 2015/0193982 A1 | 7/2015 | Mihelich et al. |
| 2016/0103998 A1 | 4/2016 | Tredoux et al. |
| 2016/0173499 A1 | 6/2016 | Bianchi et al. |
| 2016/0232336 A1 | 8/2016 | Pitschel et al. |
| 2017/0277876 A1 | 9/2017 | Alameh et al. |
| 2018/0088795 A1 | 3/2018 | Van Os et al. |
| 2018/0288030 A1 | 10/2018 | Witrisna et al. |
| 2018/0293249 A1 | 10/2018 | Tabares |
| 2019/0147662 A1 | 5/2019 | Nicholas et al. |
| 2019/0158593 A1 | 5/2019 | Sloane et al. |
| 2019/0319932 A1 | 10/2019 | Kandregula |
| 2020/0021567 A1 | 1/2020 | Salgaonkar et al. |
| 2020/0367054 A1 | 11/2020 | Obaidi |
| 2020/0389460 A1 | 12/2020 | Carbune et al. |
| 2021/0034725 A1 | 2/2021 | Donley et al. |
| 2021/0045169 A1 | 2/2021 | Pupakdee et al. |
| 2021/0109836 A1 | 4/2021 | Cranfill et al. |
| 2021/0203747 A1 | 7/2021 | Gorsica et al. |
| 2021/0204115 A1 | 7/2021 | Gorsica et al. |
| 2022/0237148 A1 | 7/2022 | Perlman et al. |
| 2022/0269333 A1* | 8/2022 | Dedonato ............ G04G 21/025 |
| 2024/0061547 A1 | 2/2024 | Fleizach et al. |
| 2024/0094528 A1 | 3/2024 | Edwin et al. |
| 2024/0220145 A1 | 7/2024 | Vedula |
| 2024/0223553 A1 | 7/2024 | Vedula et al. |
| 2024/0281235 A1 | 8/2024 | Huang et al. |
| 2024/0323340 A1 | 9/2024 | Cohen et al. |
| 2024/0330491 A1 | 10/2024 | Mittal et al. |
| 2024/0333719 A1 | 10/2024 | Cohen |

FOREIGN PATENT DOCUMENTS

| | | |
|---|---|---|
| WO | 2016/000098 A1 | 1/2016 |
| WO | 2018059934 A1 | 4/2018 |

OTHER PUBLICATIONS

International Search Report received for PCT Patent Application No. PCT/US2024/020606, mailed on Jun. 13, 2024, 5 pages.

Non-Final Office Action received for U.S. Appl. No. 18/397,902, mailed on Mar. 14, 2025, 55 pages.

MicrosoftA® Computer Dictionary, Fifth Edition, accessed via Google search on wordpress.com, 2002, pp. 154, 470.

Extended European Search Report received for European Patent Application No. 24166984.5, mailed on Aug. 12, 2024, 8 pages.

Extended European Search Report received for European Patent Application No. 24167059.5, mailed on Aug. 12, 2024, 8 pages.

International Search Report received for PCT Patent Application No. PCT/US2023/086084, mailed on Mar. 20, 2024, 4 pages.

International Search Report received for PCT Patent Application No. PCT/US2023/086401, mailed on Apr. 26, 2024, 4 pages.

Apple, "Approve What Kids Buy With Ask to Buy", Apple Support, Available online at <https://support.apple.com/en-us/HT201089>, [Retrieved from Internet on Aug. 20, 2024], 6 pages.

Apple, "Set up Family Sharing", Apple Support, Available online at <https://support.apple.com/en-us/HT201088>, [Retrieved from Internet on Aug. 20, 2024], 6 pages.

Deng et al., "Edge Intelligence: The Confluence of Edge Computing and Artificial Intelligence", IEEE Internet of Things Journal, vol. 7, No. 8, Aug. 2020, pp. 7457-7469.

Du et al., "MEC-Assisted Immersive VR Video Streaming over Terahertz Wireless Networks: A Deep Reinforcement Learning Approach", IEEE Internet of Things Journal, vol. 7, No. 10, Oct. 2020, pp. 9517-9529.

Garriss et al., "Trustworthy and Personalized Computing on Public Kiosks", MobiSys'08, Breckenridge, Colorado, USA, Jun. 17-20, 2008, pp. 199-210.

Li, Yong, "Enhancing Mobile Capacity through Generic and Effcient Resource Sharing", TRACE: Tennessee Research and Creative Exchange, Doctoral Dissertations, Dec. 2018, 112 pages.

Liu et al., "Cutting the Cord: Designing a High-quality Untethered VR System with Low Latency Remote Rendering", MobiSys'18, Munich, Germany, Jun. 10-15, 2018, pp. 68-80.

Microsoft, "Lock Your Windows PC Automatically When You Step Away From It", Available online at: <https://support.microsoft.com/en-us/windows/lock-your-windows-pc-automatically-when-you-step-away-from-it-d0a5f536-74ac-0859-820a-4140dac9fcaf>, [retrieved on Mar. 28, 2024], 3 pages.

Pattison, Sandra, "How to Put Parental Controls on iPhone and iPad in 2024", Cloudwards, Available online at <https://www.cloudwards.net/parent-controls-on-iphone/#:~:text=Can%20I%20Control%20My%20Child%27s,for%20your%20child%27s%20iOS%20device>, [Retrieved from Internet on Aug. 20, 2024], 35 pages.

Non-Final Office Action received for U.S. Appl. No. 18/611,432, mailed on Sep. 23, 2025, 12 pages.

Non-Final Office Action received for U.S. Appl. No. 18/610,159, mailed on Sep. 16, 2025, 13 pages.

Non-Final Office Action received for U.S. Appl. No. 18/611,444, mailed on Jul. 23, 2025, 6 pages.

* cited by examiner

SYSTEMS AND METHODS FOR ELECTRONIC DEVICE ACCESS

CROSS-REFERENCE TO RELATED APPLICATIONS

This application claims the benefit of U.S. Provisional Application No. 63/493,293, filed Mar. 30, 2023, and U.S. Provisional Application 63/616,463, filed Dec. 29, 2023, the contents of which are incorporated herein by reference in their entireties for all purposes.

FIELD OF THE DISCLOSURE

Aspects of the present disclosure relate to operating an electronic device with different levels of access.

BACKGROUND OF THE DISCLOSURE

Electronic devices grant and restrict access to features, such as applications and/or documents, based on user authentication. For example, access to various features is optionally granted in response to a user logging into the electronic device.

SUMMARY OF THE DISCLOSURE

Aspects of the present disclosure relate to operating an electronic device with different levels of access. The electronic device is associated with a user account of a first user. When the first user operates the electronic device in a first mode, the first electronic device allows access to a plurality of features, including a plurality of applications. The first user optionally configures a second mode of the electronic device for use by a second user. Configuring the second mode optionally includes restricting access to a subset of the applications of the plurality of applications of the electronic device. Configuring the second mode optionally includes configuring the electronic device to transmit an indication of displayed content to another electronic device for display by the other electronic device while the electronic device operates in the second mode. The electronic device transitions from the first mode to the second modes according to one or more first criteria being satisfied, as will be described herein. The electronic device transitions from the second mode to the first modes according to one or more second criteria being satisfied, as will be described herein.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Figure 1:
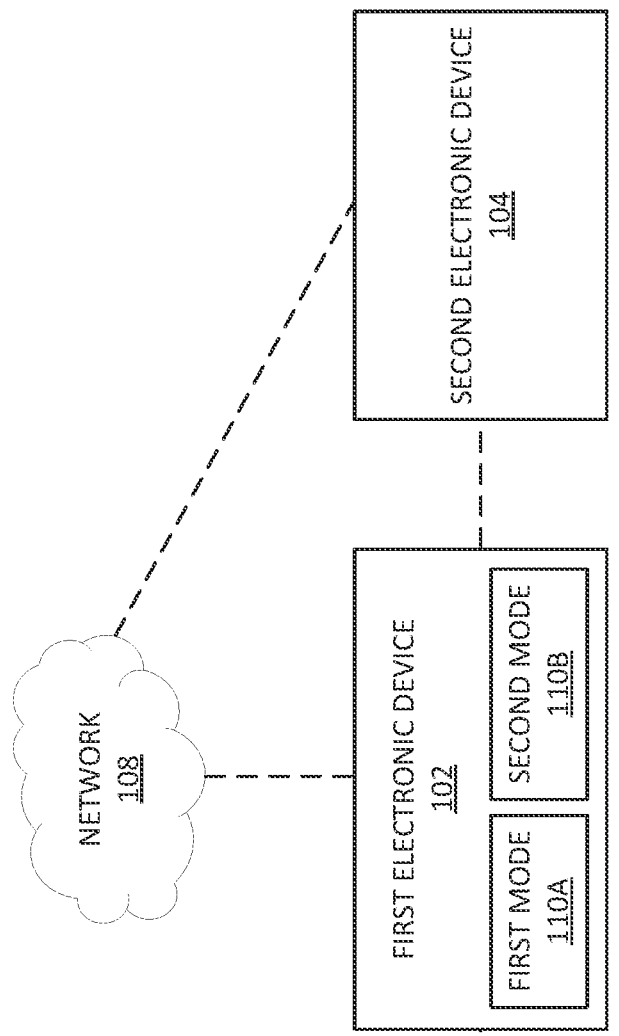
FIG. 1 illustrates a first electronic device communicatively coupled to a second electronic device according to some embodiments of the disclosure.

FIG. 1 illustrates a first electronic device, optionally communicatively coupled to a second electronic device, according to some embodiments of the disclosure. The first electronic device 102 optionally includes a mobile phone, a portable music player, a laptop computer, a desktop computer, a tablet computer, a television, or a wearable device (e.g., a watch, a wristband, a ring, an armband, a head-mounted display, etc.), among other possibilities. In some embodiments, first electronic device 102 is a wearable electronic device configured to automatically restrict access to features of the first electronic device 102 (e.g., automatically lock) when the first electronic device ceases to be worn. Second electronic device 104 optionally includes a mobile phone, wearable device, tablet, computer, or other electronic device optionally in communication with a display. The first electronic device 102 and second electronic device 104 are optionally associated with the same user account.

As described herein, the first electronic device 102 is associated with a first user account. Access to one or more of features of the first electronic device, such as settings, files and/or applications (or other information), requires user authentication. Without authenticating the first user, the first electronic device 102 blocks access to the one or more features. Authentication of the first user for the first electronic device 102 optionally includes login credentials (e.g., a username and/or a password) and/or biometric authentication (e.g., fingerprint, iris scan, facial recognition, etc.). Additionally or alternatively, authentication of the first user for the first electronic device 102 optionally includes an authentication code sent to another electronic device associated with the first user account and/or detecting another electronic device associated with the first user account near (e.g., within communication range of) the first electronic device 102. Second electronic device 104 optionally provides an authentication code or is otherwise detected by the first electronic device 102 to authenticate the first user and provide access to the one or more features of the first electronic device. The first user is sometimes referred to as the owner of the device and the second user is sometimes referred to as a guest user.

As described herein, a first user may operate the first electronic device 102 in a first mode 110A, but may also wish to allow a second user to use the first electronic device 102 in a second mode 110B, different from the first mode. For example, the first mode corresponds to the first user using their device and the second mode corresponds to a second user using the first user's device. To share a wearable device, for example, the first user removes the wearable device and the second user then wears the wearable device (the second use dons the wearable device after the first user doffs the wearable device). An automatic lock feature of the first electronic device upon removal complicates access for the second user (e.g., locking requires another means to grant access to the second user). Additionally, the first user may wish to allow the second user to access some features of the first electronic device 102 while restricting the second user from accessing other features of the first electronic device 102, as will be described in more detail below. Accordingly, one aspect of the disclosure herein is methods to provide access to features and/or data of the first electronic device to the second user in a second mode (e.g., a guest mode).

To enable access for a second user, the first user configures a second mode on the first electronic device 102. The configuration optionally includes granting permission to the next user to wear the first electronic device 102 (rather than a specific second user) access to the first electronic device 102 in the second mode 110B. The configuration optionally includes indicating a second user and/or one or more devices associated with the second user that have permission to access the first electronic device 102 in the second mode. The configuration optionally includes indicating multiple other users and/or one or more other device(s) corresponding to the one or more multiple other users that have permission to access the first electronic device 102.

In some embodiments, after configuration of the second mode, the second user accesses the first electronic device 102 by authentication of the second user. In some embodiments, the first electronic device 102 indicates to the second user a plurality of available authentication options for accessing the first electronic device 102 in the second mode. For example, the first electronic device 102 displays a prompt for the second user to input a username and/or a password for the second user, or prompts the second user to enter an authentication code. In some embodiments, the first electronic device 102 initiates biometric authentication or detects the second electronic device 104 near the first electronic device 102.

In some embodiments, the authentication modality that the first electronic device 102 uses to authenticate the first user is different from the authentication modality that the first electronic device 102 uses to authenticate the second user. For example, the first electronic device 102 optionally authenticates the first user using biometrics of the first user and authenticates the second user based on the first electronic device 102 being in communication with an electronic device associated with the second user's user account or within a threshold distance of the electronic device associated with the second user's user account. In some embodiments, the authentication modality that the first electronic device 102 uses to authenticate the second user for a first session of the second mode is different from the authentication modality that the first electronic device 102 uses to authenticate the second user for a subsequent session of the second mode. For example, the first electronic device 102 optionally authenticates the second user based on the first electronic device 102 being in communication with or within a threshold distance of an electronic device associated with the second user's user account for an initial session of the second mode (e.g., during which biometrics of the second user are configured but inaccessible to the first electronic device) and authenticates the second user using biometrics of the second user for a subsequent session.

In some embodiments in which first electronic device 102 is a wearable device or includes a wearable component (e.g., a headset or head mounted display), upon detecting a person wear the wearable device or component, the first electronic device 102 presents a lock screen user interface. The first electronic device 102 attempts to authenticate the user while displaying the lock screen user interface in one or more manners described herein. The lock screen user interface optionally includes a selectable option that, when selected, causes the first electronic device 102 to operate in the second mode 110B. The first electronic device 102 optionally enters the second mode in response to detecting selection of the option and authenticating the user as a user that has permission to use the first electronic device 102 in the second mode. The first electronic device 102 optionally enters the second mode in response to detecting selection of the option and receiving an indication from the second electronic device 104 granting permission for the other user to use the first electronic device 102 in the second mode.

In some embodiments, in addition to authenticating the second user for access to the first electronic device 102, access is optionally dependent on further permission by the first user. For example, when the second user initiates a session in the second mode, the first electronic device 102 transmits a notification to another electronic device associated with the first user's account (e.g., second electronic device 104) indicating that the second user is using or attempting to access the first electronic device 102 in the second mode. Optionally, the other electronic device (e.g., second electronic device 104) presents a prompt with options to grant or deny the second user access to the first electronic device 102. The prompt optionally includes visual, audio, or haptic aspects that provide the first user the opportunity to grant or deny access (e.g., by pressing a button, performing a gesture, providing a voice command, etc.). In some embodiments, the first user must grant access via the prompt options to provide access to the second user. In some embodiments, the second user is provided access when the first user does not provide an input to deny access in response to the prompt. Optionally, the prompt includes an option to access settings to revoke permissions for the second user (e.g., a particular second user or other users outside of the first user).

When the first user denies access, the second user is unable to access the first electronic device 102. In some embodiments, in response to receiving a request from the first user (e.g., from third electronic device 106) to deny access to the second mode, the first electronic device 102 terminates an ongoing session of the second mode. Optionally, revoking permission for the second user also blocks the second user from accessing the first electronic device 102 unless and until the first user restores access permissions to the second user (e.g., after the first user initiates an authenticated session in the first mode on the first electronic device 102 and passes the first electronic device 102 to the second user, or after the first user remotely restores access to the second user for the first electronic device 102 using third electronic device 106 associated with the first user's account).

In some embodiments, access to the first electronic device 102 by the second user in the second mode requires the first electronic device 102 to remain connected to an internet connection or other network connection (e.g., network 108). For example, when a Wi-Fi or other network connection becomes disconnected during the second mode, the first electronic device 102 terminates the second mode (or locks the device in the second mode) immediately. As another example, the first electronic device 102 terminates the second mode (or locks) after the Wi-Fi or other network connection remains disconnected beyond a grace period of time (e.g., 1, 2, 5, or 10 minutes) without the connection being restored. In this situation, when the connection is restored within the grace period of time, the first electronic device 102 does not terminate the second mode or lock the second device. Additionally, in some embodiments, some features of the first electronic device 102 that are enabled for the second user in the second mode become disabled while the connection is lost. Optionally, these features become re-enabled if the network connection is restored within a predetermined grace period of time.

In some embodiments, the second user accesses the second mode without authentication of the second user in a situation in which the second mode begins nearly immediately following configuration of the second mode by the first user in the first mode. For example, after the first user configures the second mode to provide permission to the second user, the first user ceases operating the first electronic device 102 (e.g., ceases wearing the first electronic device 102 and passes the first electronic device 102 to the second user). Thereafter, the second user has a predetermined period of time (e.g., 30 seconds, 1 minute, 2 minutes, 5 minutes) to begin use of the first device in the second mode (e.g., wearing the first electronic device 102).

In some embodiments, the first user configuring the second mode includes the first user selecting one or more features of the electronic device to allow the second user to access. For example, the first user optionally permits the second user to access a first subset of applications (e.g., applications currently open on the first electronic device 102), but restricts access to a second subset of applications (e.g., applications not currently open on the first electronic device 102). In some embodiments, the first user configuring the second mode includes the first user configuring the first electronic device 102 to transmit, to another electronic device (e.g., the second electronic device 104) an indication of images being displayed by the first electronic device 102 so that the other electronic device is able to display representations of the images displayed by the first electronic device 102 in the second mode 110B (e.g., screen mirroring or screen sharing).

Once the first user configures the second mode 110B of the first electronic device 102, the first user can optionally doff and pass the first electronic device 102 to the second user for the second user to don and use the first electronic device 102. Optionally, the first user unlocks the first electronic device 102 using the second electronic device 104 without the first user unlocking the first electronic device 102 while wearing the first electronic device 102. As described above, the first electronic device 102 and the second electronic device 104 are both associated with a user account of the first user.

In some embodiments, in response to detecting a user wearing the first electronic device 102 after the first electronic device 102 is configured in second mode 110B (e.g., without intervening use of the first electronic device after the first user ceases wearing the first electronic device 102), the first electronic device 102 optionally requests or obtains data from the second user (or second user account or second user's device) that the first electronic device 102 uses to operate. For example, when the first electronic device 102 is configured to monitor body movements (e.g., tracking eyes, or hands, or fingers, etc.) and receive inputs including finger or hand gestures and/or gaze, the first electronic device 102 optionally requests or obtains one or more images of body parts of the second user, such as one or more images of a user's hands or eyes. Optionally, the first electronic device 102 deletes or otherwise does not store this data after the second user concludes a session of using the first electronic device 102 in the second mode 110B. Optionally, the first electronic device 102 concludes the session of using the first electronic device 102 in the second mode upon detecting doff of the wearable device. In some embodiments, the first electronic device 102 requests that the second user, or another guest user, provides this data again during subsequent use of the first electronic device 102. Alternatively, the first electronic device 102 optionally stores this data associated with the second user, and optionally uses this data to identify the second user or for body tracking during subsequent sessions of use of the first electronic device 102 by the second user.

In some embodiments, the first electronic device 102 stores the data associated with the second user at the conclusion of use of the first electronic device 102 by the second user in the second mode 110B for subsequent use of the first electronic device 102 in the second mode 110B by the second user. While the first electronic device 102 stores data associated with the second user after concluding a session of use in the second mode 110B, the electronic device 102 receives a request to transition from the first mode 110A to the second mode 110B again. In response to this request, the first electronic device 102 initiates the process to transition to the second mode 110B. After the first user has doffed the first electronic device 102 and the second user has donned the first electronic device 102, the first electronic device 102 presents a selectable option to operate using the stored data associated with the second user and a selectable option to obtain new data associated with the current user. For example, if the user is a third user different from the second user and the first user, the third user could select the option to have the electronic device 102 collect new data associated with the third user for use in the second mode 110B. As another example, if the user is the second user, the second user can select the option to have the electronic device 102 operate using the data associated with the second user, thereby bypassing the process to collect the data again.

In some embodiments, the first electronic device 102 displays the option to operate the first electronic device 102 using the data associated with the second user with a timestamp indicating the time of the previous session of use of the first electronic device 102 in the second mode 110B. This information helps the user determine whether the stored data is associated with them or with a different user so the user can decide which option to select.

In some embodiments, while displaying the options and prior to receiving an input selecting one of the options, the first electronic device 102 loads the data associated with the second user into a volume for use in the second mode 110B to check that the first electronic device 102 is set up in a way that is compatible with the data. For example, if the data indicates the use of hardware accessories, such as corrective lenses, the first electronic device 102 checks that the lenses are installed.

In some embodiments, in response to receiving an input selecting the option to obtain new data associated with the current user, the first electronic device 102 collects the data associated with the current user and operates the second mode 110B using that data. For example, the data includes data related to the eyes and hands of the third user, as described above. At the conclusion of the second mode 110B, the first electronic device 102 saves the data associated with the third user and presents an option to operate using that data the next time the first electronic device 102 operates in the second mode 110B. In some embodiments, the first electronic device 102 saves the data associated with multiple guest users. In some embodiments, the first electronic device 102 saves the data associated with the most recent guest user and deletes data associated with previous guest users, such as storing the data associated with the third user and deleting the data associated with the second user.

Figure 2:
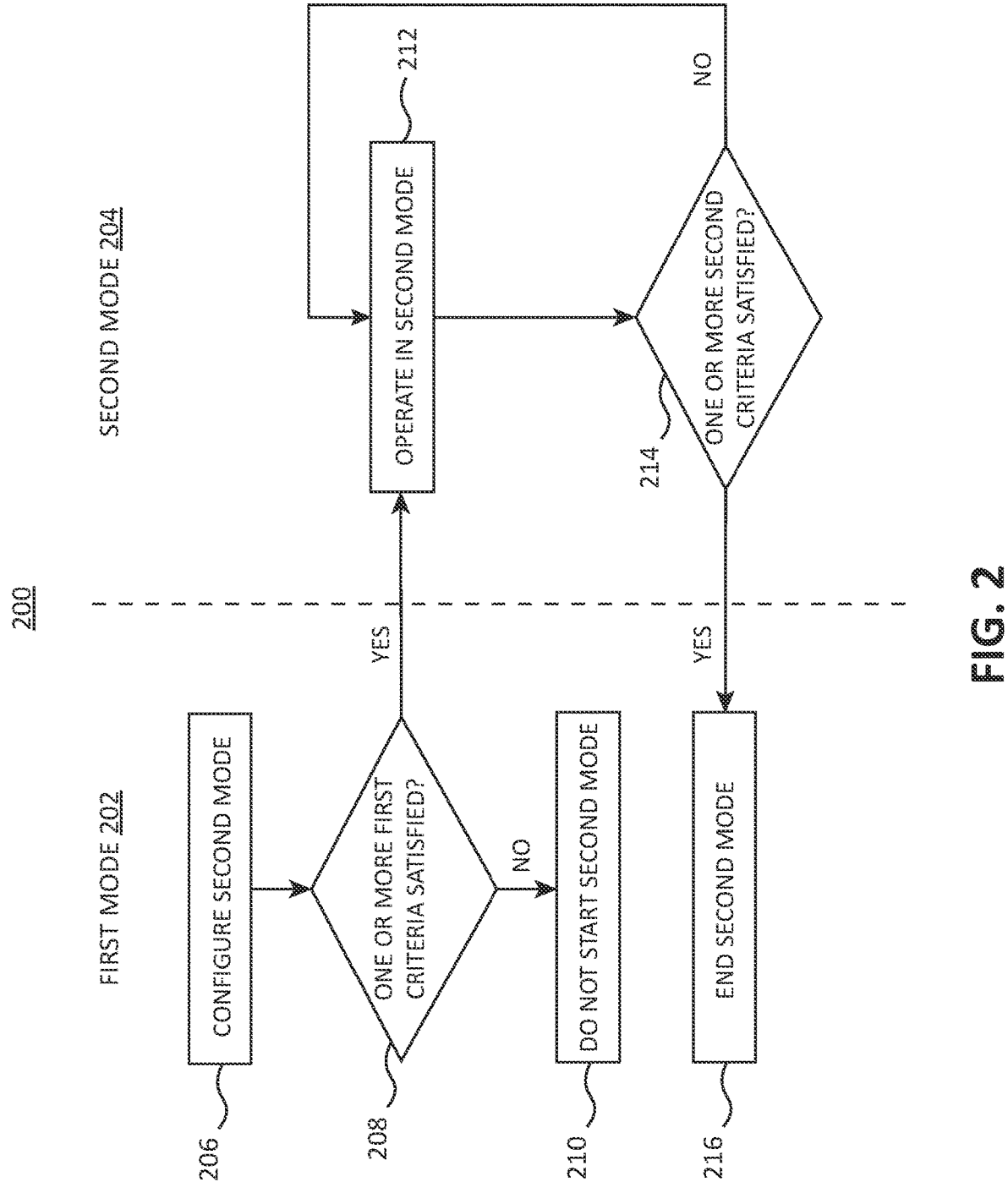
FIG. 2 illustrates a flow chart of an example process for operating an electronic device in one of two modes according to some embodiments of the disclosure.

FIG. 2 illustrates a flow chart of an example process for operating an electronic device in one of two modes according to some embodiments of the disclosure. First electronic device 102 optionally performs method 200 to transition between a first mode 202 and a second mode 204. The first electronic device 102 operates in the first mode 202 when giving unrestricted access to the first electronic device 102 to the first user of the first electronic device 102. The first electronic device 102 optionally operates in the second mode 204 when a second user, optionally different from the first user, is using the first electronic device 102 with one or more restrictions in place, as will be described in more detail below. While operating in the first mode 202, the first electronic device 102 processes sensor data based on first data associated with a first user account. For example, the first electronic device 102 processes inputs received using one or more sensors and/or input devices based on enrollment data of the first user. Additionally or alternatively, operating in the first mode 202 includes displaying images using a display based on the enrollment data of the first user. While operating in the second mode 204, the first electronic device 102 processes sensor data based on second data associated with a second user account. For example, the first electronic device 102 processes inputs received using one or more sensors and/or input devices based on enrollment data of the second user. Additionally or alternatively, operating in the second mode 204 includes displaying images using a display based on the enrollment data of the second user.

At block 206, the first electronic device 102 configures the second mode. Optionally, the first electronic device 102 operates in the first mode 202 while configuring the second mode. The electronic device operates in the first mode 202 in response to authenticating the first user. For example, the first user wears a wearable component of the first electronic device 102, such as a head-mounted display, while using the first electronic device 102 in the first mode. Configuring the second mode optionally includes receiving one or more inputs from a user of the first electronic device 102, the one or more inputs indicating and/or selecting one or more options for how the second mode should be configured. These options optionally include one or more of an option for which application(s) will be accessible during the second mode (e.g., partial application access or all-application access) and/or an option for transmitting an indication of content displayed by the first electronic device 102 during the second mode to another electronic device for display, such as second electronic device 104 described above. These options are described in further detail below.

As described herein, access to features of the first electronic device by the first user in the first mode is different than the access to features of the first electronic device by the second user in the second mode. For example, the second mode 110B includes access to a more limited feature set compared to the features accessible to the first user of the first electronic device 102 in the first mode 110A. For example, the first user optionally has access to all applications on the first electronic device 102 in the first mode, whereas the second user has access to a subset of applications on the first electronic device 102 in the second mode. Additionally or alternatively, the first user optionally has access to more features of the applications on the first electronic device 102 in the first mode, whereas the second user has access to a subset of features of the applications on the first electronic device 102 in the second mode. For example, payment features of a payment application may be unavailable to the second user or may require the second user to provide payment information of the second user to access this feature. As another example, the communication sessions using the first electronic device are optionally restricted for the second user such that a representation of the first user (e.g., an image or avatar) cannot be used in the second mode. Additionally or alternatively, the first user optionally has access to all documents and files on the first electronic device 102 in the first mode, whereas the second user has access to a subset of the documents and files (or no documents and files associated with the first user account) on the first electronic device 102 in the second mode (e.g., the first user's data is hidden, encrypted, or otherwise inaccessible by the second user). As a further example, while in the second mode, the second user is optionally unable to save files and/or configurations of the first electronic device 102 to be stored in memory of the first electronic device 102 at the conclusion of the session of the second mode. As another example, while in the second mode, the second user is able to access (e.g., run) one or more applications (e.g., access application binaries), but is unable to access the first user's user data associated with the applications. In this example, the first user is able to access the user data while the first electronic device is in the first mode. In such examples, the second mode is not merely a different user profile or login account of the first electronic device 102 with the same features and permissions as the first user account.

In some embodiments, the first electronic device 102 begins the process to configure the second mode 204 in response to receiving one or more user inputs. For example, the first electronic device 102 receives an input corresponding to a request to display a system user interface, such as a controls user interface. The input corresponding to the request to display the system user interface is optionally a gesture performed with the hand(s) and/or arm(s) of the user. The controls user interface includes a plurality of selectable options that cause the first electronic device 102 to perform various operations and/or to change an aspect of ongoing operation. For example, the controls user interface includes options for changing audio volume output, display brightness, network connectivity, notifications and/or media playback settings. The controls user interface further includes an option for configuring the second mode. In response to receiving a user input selecting the option for configuring the second mode, the first electronic device 102 presents a configuration user interface including options to configure various aspects of the second mode. The configuration user interface is optionally a user interface presented within the controls user interface. The configuration user interface is optionally a user interface presented outside of the controls user interface, concurrently or not concurrently with the controls user interface. Alternatively, the controls user interface is updated to include the configuration user interface in response to receiving the input requesting display of the configuration user interface. Optionally, in response to receiving an input requesting to start the second mode, the electronic device closes the configuration user interface and/or the controls user interface and displays an indication (e.g., a notification, a pop-up, or a banner) indicating that the electronic device is transitioning to the second mode.

As described above, configuring the second mode includes configuring which applications will be accessible during the second mode. In some embodiments, the first electronic device 102 presents an option for all applications to be accessible in the second mode and an option for only currently-displayed applications to be accessible in the second mode, with other applications not currently displayed by the first electronic device 102 not being accessible in the second mode. Alternatively, the first electronic device 102 displays a toggle used to control whether all applications are available or whether the currently-displayed applications are available and other applications are restricted. For example, while presenting the options for controlling which applications are accessible in the second mode, the first electronic device 102 displays one or more user interfaces of one or more applications running on the first electronic device 102. The user interfaces of the one or more applications running on the first electronic device 102 are optionally application windows of the applications, virtual objects associated with the applications, and/or content items associated with the applications. The user interfaces of the one or more applications running on the first electronic device 102 are optionally icons or thumbnails of the applications. As another example, the configuration user interface is not displayed concurrently with other user interfaces, but includes an option to share the applications that were displayed just prior to displaying the configuration user interface.

In response to detecting one or more inputs configuring the second mode to include allowing access to the applications that are currently displayed and restricting access to applications not currently displayed, the first electronic device 102 will configure the second mode as requested. Allowing access to all applications optionally includes allowing the first electronic device 102 to access features of the applications other than those currently displayed. For example, using an allowed application in the second mode, interactions with and display of user interfaces that are different from the particular user interfaces that were currently displayed during configuration of the second mode are allowed. Restricting access to the applications that are not displayed optionally includes restricting the first electronic device 102 from opening the restricted applications. Optionally, the first electronic device in the second mode forgoes displaying of options to launch those restricted applications or by displaying the options to launch those restricted applications, but forgoing launching the applications in response to detecting selection of the options to launch those applications. For example, a home screen user interface of the first mode 110A includes options for launching applications that are allowed in both modes and applications that are restricted in the second mode 110B while operating the first electronic device 102 in the first mode 110A, but does not include options for launching restricted applications in the second mode 110B. Optionally, the first electronic device displays options to launch restricted applications in the second mode with an appearance different from the appearance of the options when the applications are allowed to launch, such as displaying the options with reduced color saturation, increased translucency, and/or with an icon displayed overlaid on the options that indicates that the options are not selectable. Optionally, while the second mode 204 is configured to restrict access to certain applications, the first electronic device 102 restricts access from certain system user interfaces, such as the home screen user interface that includes options for launching various applications of the first electronic device 102. Alternatively, in some embodiments, the electronic device 102 presents the home screen user interface in the second mode 204 with options for launching restricted applications displayed with an appearance that indicates that these options are not selectable. In these embodiments, options for launching permitted application as displayed with an appearance that indicates that these options are selectable. For example, the appearance that indicates that a respective option is not selectable has more translucency, less color saturation, a smaller size, and/or different colors than the appearance that indicates that a respective option is selectable.

In response to detecting one or more inputs configuring the second mode to allow access to all applications on the first electronic device 102, the first electronic device 102 configures the second mode 204 to allow access to both the applications that were displayed during configuration of the second mode and applications not displayed during configuration of the second mode. Optionally, while the second mode 204 is configured to allow access to all applications of the first electronic device 102, the first electronic device 102 allows access to the home screen user interface during the second mode, thereby providing a user interface from which the second user is able to select a new application to open.

Some features of the first electronic device 102 are restricted regardless of whether all applications are accessible or whether some applications are restricted, such as accessing or using saved passwords, accessing or using a representation (e.g., three-dimensional avatar, representation of eyes, etc.) of the first user in communication sessions or otherwise, making payments, accessing or using biometric data of the first user, and/or accessing or using health data of the first user. Additionally or alternatively, making changes to the user account of the first electronic device 102 is optionally restricted regardless of whether all applications are accessible or whether some applications are restricted. Optionally, the first electronic device 102 forgoes displaying user interface elements (e.g., selectable options or buttons) associated with restricted features in the second mode. Optionally, the first electronic device 102 displays the user interface elements associated with restricted features in the second mode with a modified appearance that indicates that the features are restricted, as described above with respect to icons for accessing applications that are restricted.

Configuring the second mode optionally includes configuring the first electronic device 102 to transmit an indication of the content currently displayed in the second mode 204 to another electronic device for display. The user interface including options for configuring the second mode 204 includes options (or a toggle) for enabling or disabling sharing the indications of displayed content with another electronic device. Enabling sharing the indications of displayed content with another electronic device optionally includes selecting an electronic device to which the indications of the content being displayed by the first electronic device 102 will be sent. The first electronic device 102 optionally displays a menu including one or more options corresponding to devices that are able to display the representation of the content being displayed by the first electronic device 102, such as one or more devices that are within a threshold distance of the first electronic device 102, on the same network as the first electronic device 102, and/or are associated with the same user account as the first electronic device 102. The first electronic device 102 optionally displays content using a three-dimensional display, such as a head-mounted display, and the other electronic device optionally displays a two-dimensional representation of the content being displayed by the first electronic device 102 in the second mode 204. For example, the other electronic device displays a two-dimensional representation of three-dimensional content in an augmented reality environment, as an exploded view, or by simulating a single viewpoint into a three-dimensional environment displayed by the first electronic device 102.

At block 208, the first electronic device 102 determines whether or not one or more first criteria for entering the second mode are satisfied. The one or more first criteria optionally include a criterion that is satisfied in response to detecting that the second mode is configured and/or in response to receiving an input requesting that the first electronic device 102 operate in the second mode 204. Optionally, the one or more first criteria include a criterion that is satisfied when the first electronic device 102 detects a doff of the component of the first electronic device 102, and within a predetermined time threshold (e.g., 30 second, 1 minute, 5 minutes), detects a don of the component of the first electronic device. As described above, an example use case for the second mode 204 of the first electronic device 102 includes the first user configuring the second mode 204 of the first electronic device 102 while wearing at least a component (e.g., a wearable input or output device, such as a headset) of the first electronic device 102, followed by the first user removing the component, then the second user wearing the component.

In some embodiments, the second mode begins upon before detection of doff of the first electronic device. For example, the one or more first criteria are optionally satisfied without detecting the first user doff the component of the first electronic device 102. In some such embodiments, the first electronic device 102 begins operation in the second mode 204 while the first user is still wearing and using the first electronic device 102. In some such embodiments, the first electronic device 102 remains in the second mode while the first user doffs the component of the first electronic device 102 and the next user dons the component of the first electronic device 102. Alternatively, in some such embodiments, the first electronic device 102 exits the second mode when a subsequent don is not detected within the predetermined time threshold from detecting doff.

In some embodiments, the second mode begins upon detection of doff of the first electronic device. For example, the one or more first criteria optionally include a criterion that is satisfied when the first electronic device 102 detects a doff of the component of the first electronic device 102. In some such embodiments, the first electronic device 102 enters and remains in the second mode after the doff of the component of the first electronic device 102 and while the next user dons the component of the first electronic device 102. Alternatively, in some such embodiments, the first electronic device 102 exits the second mode when a subsequent don is not detected within the predetermined time threshold from detecting doff.

In some embodiments, the second mode begins upon detection of a subsequent don. For example, the one or more first criteria optionally include a criterion that is satisfied when the first electronic device 102 detects the doff of the component of the first electronic device 102 followed by detecting a next user (e.g., the first user or the second user) don the component of the first electronic device 102. In some such embodiments, the first electronic device 102 enters the second mode 204 when the next user dons the component of the first electronic device 102. In some such embodiments, the first electronic device 102 does not enter into the second when a subsequent don is not detected within the predetermined time threshold from detecting doff.

At block 210, if the one or more first criteria are not satisfied ("no" at block 208), then the first electronic device 102 does not start the second mode. Optionally, if the one or more first criteria are not satisfied within the predetermined time threshold, the one or more first criteria are not satisfied. Optionally, the one or more first criteria are not satisfied in response to the first electronic device 102 receiving an input requesting that transition to the second mode be canceled. Forgoing starting the second mode optionally includes continuing to operate in the first mode 202 (e.g., when the predetermine time period expires or cancelation input is received prior to doff by the first user). Forgoing starting the second mode optionally includes locking the first electronic device 102 from operation unless and until the first electronic device 102 receives the authentication credentials for the first user (e.g., when the predetermine time period expires after doff by the first user).

At block 212, if the one or more first criteria are satisfied ("yes" at block 208), the first electronic device 102 operates in the second mode 204. At the start of the second mode 204, the first electronic device 102 presents a lock screen user interface with an option to collect user enrollment data to use the first electronic device 102. In response to detecting selection of the option, the first electronic device 102 presents the user interface for collecting user enrollment data. In some embodiments, the lock screen user interface further includes an option to operate using previously-collected guest user enrollment data, as described above. Alternatively, the first electronic device 102 displays the user interface for collecting user enrollment data without displaying the lock screen user interface first. Collecting the user enrollment data for the second user optionally includes capturing images of the user's hands, eyes, and/or other parts of the body and/or sensing other data, such as recording the user's voice using a microphone and/or capturing motion using camera(s), gyroscopes, and/or accelerometers. For example, the first electronic device 102 uses the images of the user's hands for receiving inputs based on movement and/or shapes of the user's hands and uses the images of the user's eyes to display content (e.g., using a head-mounted display). Optionally, the user enrollment process for the second user does not include all of the operations that are included when enrolling the user of the user account associated with the first electronic device 102, such as enrolling the first user. For example, enrollment of the first user optionally includes collecting information about corrective lenses for a head mounted display, configuring network (e.g., Wi-Fi) connection(s), and configuring a user account to be associated with the first electronic device 102 in addition to hand and eye enrollment. Optionally, when operating in the second mode 204, the first electronic device retains some configuration settings from the first mode 202, such as Wi-Fi settings.

As described herein, operating in the second mode includes allowing access to a subset of features that are accessible in the first mode 202. The features that are restricted depend on how the second mode was configured at block 206. In some situations, the second mode 204 includes restricting access to some applications and allowing access to other applications. In some situations, the second mode 204 includes access to all applications of the first electronic device 102. In some situations, the second mode 204 includes transmitting an indication of the content being displayed to another electronic device so the other electronic device is able to display a representation of the displayed content during operation in the second mode 204. As described previously, operating the second mode includes restricting access to features such as accessing saved passwords, using a three-dimensional avatar of the first user in communication sessions, making changes to the user account of the first electronic device 102, making payments, accessing or using biometric data of the first user, and accessing or using health data of the first user regardless of other configurations of the second mode. Operating in the second mode 204 optionally includes access to a system user interface of the first electronic device 102 that includes options for adjusting accessibility settings and/or for adjusting the user enrollment data regardless of the other configurations of the second mode 204.

The second mode 204 has additional differences from the first mode 202. The first electronic device 102 uses the enrollment data for the second user while operating in the second mode 204, and uses enrollment data for the first user while operating in the first mode 202. As described above, using the enrollment data includes receiving inputs based on hand enrollment data and/or displaying images based on eye enrollment data. The first electronic device 102 optionally displays an image representing the user while in use, such as an image of a portion of a user's face that is displayed using a display (e.g., an externally-facing display) on the outer housing of a head-mounted display for viewing by people other than the user that is currently using the first electronic device 102. Optionally, while operating in the first mode 202, the first electronic device 102 displays an image that is customized to the first user, such as including colors (e.g., skin, hair, and/or eye colors) and/or shapes (e.g., eye, nose, and/or hairline shapes) matching those of the first user. Optionally, while operating in the second mode 204, the first electronic device 102 displays a generic image not customized to the user currently using the first electronic device 102 that is also different from the image that is customized to the first user. Alternatively, the first electronic device 102 generates an image customized to the second user; for example, during user enrollment, to use in the second mode. As described above, it is possible to configure the first mode 202 to use the first electronic device 102 with corrective lenses, but optionally not possible to configure the second mode 204 for use with corrective lenses. The first electronic device 102 is optionally compatible with corrective lenses that can be inserted and/or removed from a display component of the first electronic device 102, such as from part of a head mounted display. If corrective lenses are used in the first mode 202, the electronic device 102 optionally presents a reminder to the user to remove the corrective lenses while configuring the second mode 204 and/or while transitioning from the first mode 202 to the second mode 204. If corrective lenses are used in the first mode 202, the electronic device 102 optionally presents a reminder to the user to re-insert the corrective lenses while transitioning from the second mode 204 to the first mode 202.

At block 214, while operating in the second mode 204, the first electronic device 102 determines whether one or more second criteria for ceasing operation of the second mode 204 are satisfied. The one or more second criteria optionally include a criterion that is satisfied in response to detecting the doff of at least a component of the first electronic device 102. The one or more second criteria optionally include a criterion that is satisfied in response to receiving an input or a sequence of inputs requesting that the first electronic device 102 cease operating in the second mode 204. For example, the first electronic device 102 displays a system user interface in response to receiving an input. The system user interface optionally includes a selectable option to end operation of the first electronic device 102 in the second mode 204, and the one or more second criteria include a criterion that is satisfied in response to detecting selection of that option. The one or more second criteria optionally include a criterion that is satisfied in response to a predetermined period of time of operation in the second mode 204 elapsing. The electronic device optionally displays an option to end operation in the second mode 204 in response to detecting a user (e.g., the second user) doff the component of the first electronic device 102 followed by detecting a user (e.g., the first user) don the component of the first electronic device 102. The one or more second criteria optionally include a criterion that is satisfied in response to detecting selection of this option. Optionally, the one or more second criteria are satisfied when a subset (e.g., one or multiple) of the aforementioned criteria is satisfied. Optionally, the one or more second criteria require all the criteria to be satisfied.

The first electronic device 102 continues operation in the second mode 204 in response to the one or more second criteria not being satisfied ("no" at block 214). Optionally, while operating in the second mode 204, the first electronic device 102 periodically and/or continuously checks whether or not the one or more second criteria are satisfied at block 214.

At block 216, the first electronic device 102 ends operation in the second mode in response to the one or more second criteria being satisfied ("yes" at block 214). Optionally, when ceasing operation in the second mode 204, the first electronic device 102 returns to the first mode 202. Optionally, when ceasing operation in the second mode 204, the first electronic device 102 locks unless and until the first electronic device 102 detects authentication by the first user. Optionally, when ceasing operation in the second mode 204, the first electronic device 102 deletes user enrollment data for the second user.

As described above with reference to FIG. 2, in some embodiments, the first electronic device 102 transitions from the second mode to the first mode in response to detecting the component of the first electronic device 102 being doffed. Optionally, the first electronic device 102 remains in the second mode unless and until the first electronic device 102 receives an input requesting to end the second mode. In these implementations, a third user is able to don the component of the first electronic device 102 and use the first electronic device 102 in the second mode after the second user doffs the component of the first electronic device 102 without the first electronic device 102 authenticating the first user and without the first user configuring the second mode between the second user and the third user using the first electronic device 102 in the second mode. Optionally, the first electronic device 102 remains in the second mode after the second user doff's the component of the first electronic device 102 for a predetermined time threshold (e.g., 1, 5, or 15 minutes). In these implementations, it is possible for the third user to use the first electronic device 102 in the second mode after the second user doffs the component of the first electronic device 102 as described above if the third user dons the first electronic device 102 within the time threshold. Alternatively, it is possible for the second user to resume using the first electronic device 102 in the guest mode if the second user dons the component of the first electronic device 102 within the threshold time of doffing the component of the first electronic device 102, but it is not possible for a third user to use the first electronic device 102 without the first user configuring the guest mode again. Optionally, the first electronic device 102 retains the user enrollment data of the second user unless and until the threshold time passes after the second user doffs the component of the first electronic device 102 without another user (e.g., the second user or a different user) donning the first electronic device 102. In these implementations, the first electronic device 102 becomes locked after the time threshold has passed since the second user doffed the component of the first electronic device 102.

As described above with reference to FIG. 2, in some embodiments, the first electronic device 102 enters the second mode 204 in response to the one or more criteria being satisfied, including the first user configuring the second mode while operating the first electronic device 102 in the first mode 202. Alternatively, the first electronic device 102 enters the second mode 204 without the first user configuring the second mode 204 before the session of use in the second mode 204. For example, the first electronic device 102 is locked prior to operating in the second mode 204. The first electronic device 102 optionally displays a lock screen user interface including an option to initiate operation in the first mode 202 in response to detecting authentication of the first user and an option to initiate operation in the second mode 204 without detecting authentication of the first user. Operating in the second mode includes setting restrictions previously configured by the first user in the first mode 202 of the first electronic device 102. Optionally, starting the second mode 204 while the first electronic device 102 is locked is available within a threshold time of detecting the first user doff the component of the first electronic device 102, such as 5 minutes, 15 minutes, 1 hour, or 1 day; and not available once the threshold time has passed. Optionally, starting the second mode 204 while the first electronic device 102 is locked is available irrespective of the time since the first user doffed the component of the first electronic device 102. Optionally, starting the second mode 204 while the first electronic device 102 is locked is available to a second user identified as being approved to use the first electronic device 102 in this way, but is not available to users other than the first user that are not approved. For example, the first electronic device 102 identifies the second user based on an iris scan and/or inter pupillary distance, passcode, or proximity of an electronic device associated with the second user (e.g., the second user's smartphone). Optionally, starting the second mode 204 while the first electronic device 102 is locked is available to any user.

In some embodiments, the first electronic device 102 stores guest mode configuration settings in association with various guest users. For example, the first electronic device 102 stores settings associated with a second user including which applications the second should have access to in the second mode and settings associated with a third user including which applications the third user should have access to in the second mode. The settings associated with the second user can be different from the settings associated with the third user. Optionally, while configuring the second mode 110B, the user can select an option to use stored configuration settings associated with a particular guest user.

In some embodiments, retaining data related to the second user, such as user enrollment data and/or login data, such as iris scan or inter pupillary distance, enables the first electronic device 102 to enter the second mode in response to detecting the second user don the component of the first electronic device 102. Optionally, the first electronic device 102 transitions from the second mode 204 to the first mode 202 in response to authenticating the first user wearing the component of the first electronic device 102. Alternatively, the first electronic device 102 remains in the second mode 204 after authenticating the first user, thus enabling the first user to experience the second mode 204. Optionally, the first electronic device 102 locks and does not allow operation in either the first mode 202 or the second mode 204 in response to detecting that the component of the first electronic device 102 is donned by a user other than the first user or the second user. Optionally, after the first electronic device 102 locks in this way, the second user is able to wear the component of the first electronic device 120 to start operation of the first electronic device 102 in the second mode. Alternatively, the first electronic device 102 does not operate in the second mode 204 after locking unless and until the first user dons the component of the first electronic device 102 and configures the second mode again.

As described above with reference to FIG. 2, in some embodiments, the first electronic device 102 deletes the user enrollment data of the second user at the end of the second mode 204 and ends the second mode 204 in response to detecting the first electronic device 102 being doffed. Alternatively, in some embodiments, the first electronic device 102 preserves the user enrollment data of the second user after the second user doffs the component of the first electronic device 102. In some such embodiments, the second user is able to resume the second mode 204 after the first user adjusts one or more configuration settings of the second mode 204. For example, the second user doffs the component of the first electronic device 102, then the first user dons the component of the first electronic device 102 to make changes to the second mode 204 of the first electronic device 102, then the second user dons the component of the first electronic device 102 and uses the first electronic device 102 in the second mode with the modified configuration without having to undergo the process to collect user enrollment data again. Thus, the first electronic device 102 optionally retains the user enrollment data of the second user indefinitely or for a predetermined time (e.g., 5 minutes, 15 minutes, 1 hour, or 1 day) after the second user doffs the component of the first electronic device 102 in the second mode 204.

Figure 3:
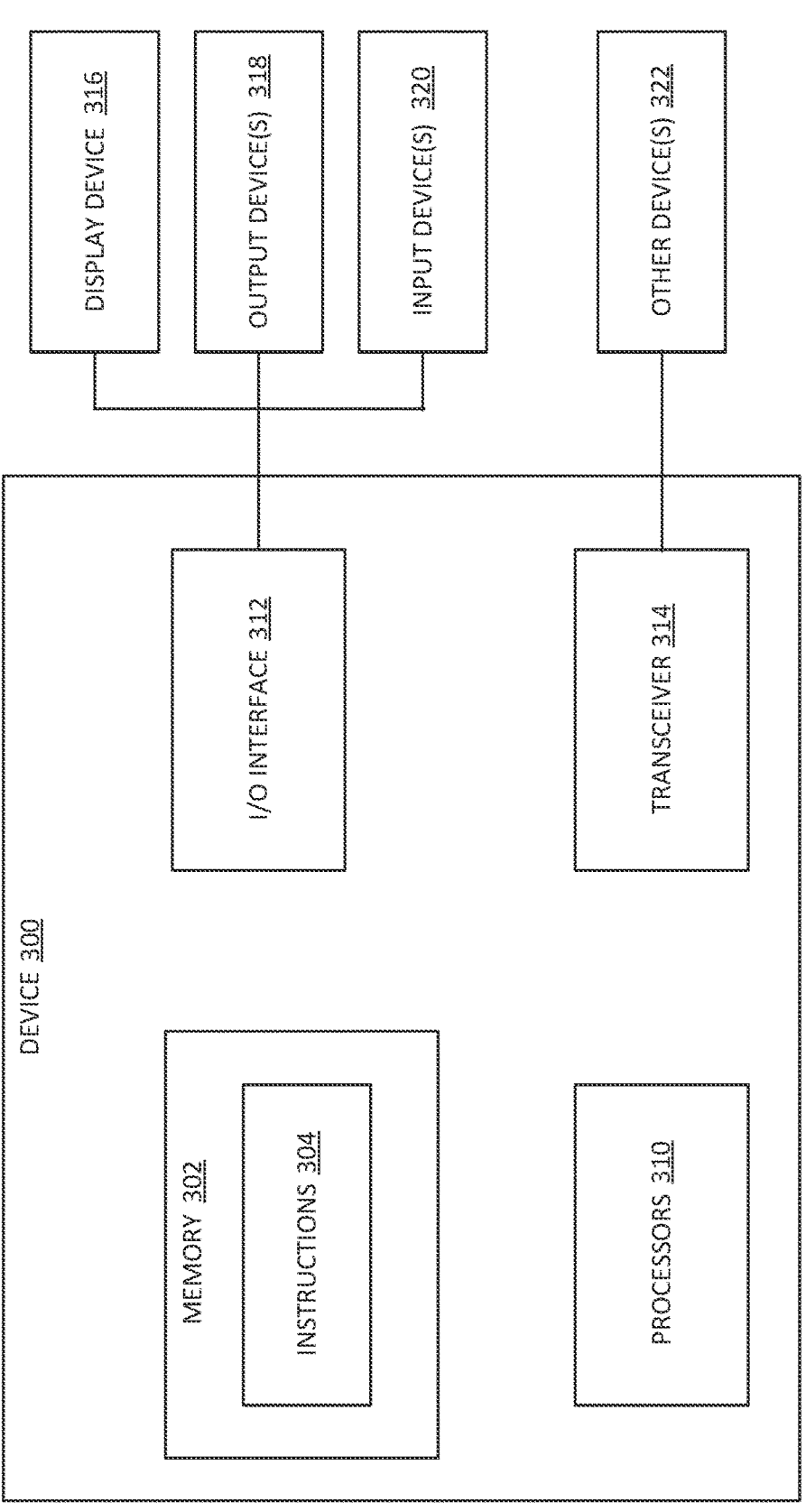
FIG. 3 is an example block diagram of an electronic device according to some embodiments of the disclosure.

FIG. 3 is an example block diagram of an electronic device 300 according to some embodiments of the disclosure. The first electronic device 102 and/or second electronic device 104 described above with reference to FIG. 1 optionally share the same architecture as electronic device 300. However, it is possible for the first electronic device 102 and/or second electronic device 104 to include more, fewer, or different components than shown in the architecture of electronic device 300. The electronic device 300 includes memory 302, one or more processors 310, I/O interface 312, and transceiver 314.

Memory 302 of electronic device 300 includes volatile and/or non-volatile memory implemented using electronic, electromagnetic, magnetic, infrared, optical, and/or semiconductor system(s) and/or device(s). Examples of suitable memory circuitry include random access memory (RAM) devices (e.g., static random-access memory (SRAM), double-data-rate random-access memory (DDR RAM), dynamic random-access memory (DRAM), or other high-speed RAM or solid-state RAM, etc.), flash memory devices, read-only memory (ROM) devices, or erasable or electrically erasable programmable read-only memory devices (EPROM or EEPROM). Other types of memory are possible. Memory 302 is optionally separate from the one or more other components of electronic device 300 and electrically coupled to the one or more other components of electronic device 300 for read and/or write operations. Some of memory 302 is optionally integrated within other components of electronic device 300.

At least a portion of the memory 302 can be referred as a computer-readable storage medium. Memory 302 and/or a transitory or non-transitory computer readable storage medium of memory 302 optionally store instructions, programs, data structures and/or modules or a subset or combination thereof. Memory 302 and/or the computer readable storage medium optionally store instructions 304 and/or programs, which when executed by processors 310, cause the electronic device 300 (or a computing system more generally) to perform one or more functions and methods of one or more examples of this disclosure, such as one or more of the methods described herein with reference to FIGS. 1-2. As used herein, a "non-transitory computer-readable storage medium" includes any tangible medium (e.g., excluding signals) that can contain or store programs/instructions for use by the electronic device (e.g., processing circuitry), for example.

The electronic device 300 further includes one or more processors 310. Processors 310 optionally include graphics processing units (GPUs), central processing units (CPUs), microprocessors, microcontrollers, programmable logic device (PLD), field-programmable gate arrays (FPGAs), application specific integrated circuits (ASICs), digital signal processors (DSPs), or any suitable processing circuitry. The electronic device 300 uses processors 310 to perform any of the functions, processes, and/or methods described herein (e.g., optionally by executing instructions or programs stored in memory 302 and/or a non-transitory computer-readable storage medium).

The electronic device 300 further includes an I/O interface 312. I/O interface 312 includes circuitry such as data lines, address lines, and control lines, for example, which enables communication between the electronic device 300 and one or more peripherals, such as display device 316, output device(s) 318, and input device(s) 320. Example display devices include, but are not limited to, monitors, television screens, touch screens, projectors, and/or head mounted displays implemented with LCD (liquid crystal display), LED (light emitting diode), OLED (organic light emitting diode), and/or other technology. Examples of other output device(s) 318 include, but are not limited to audio output devices (e.g., wired and/or wireless speakers and/or headphones), tactile output devices (e.g., haptic and/or vibration devices), and other visual output devices (e.g., indicator lights). Example input device(s) 320 include camera(s) (e.g., visible light cameras and/or infrared cameras), depth sensors (e.g., range sensors and/or LiDAR), trackpads, mouses, touch screens, microphones, keyboards, pedals, remote controls, and/or video game controllers.

The electronic device 300 includes a transceiver 314 (e.g., wired and/or wireless communication circuitry). Transceiver 314 includes transmitter and/or receiver circuitry, including but not limited to signal generator(s), oscillator(s), modulator(s), encoder(s), amplifier(s), antenna(s), demodulator(s), filter(s), decoder(s), and/or tuner(s), for example. In some embodiments, the transceiver 314 is configured to communicate with other device(s) 322 using one or more protocols, including but not limited to, Bluetooth, Wi-Fi, Wi-Fi Direct, radio, cellular communication, satellite communication, and/or wired communication.

As described above, the components and configuration of components of electronic device 300 according to the disclosure are not limited by the example illustrated and described with reference to FIG. 3. In some embodiments, one or more of the components of the electronic device 300 included in FIG. 3 and any additional components of the electronic device 300 not shown in FIG. 3 are in communication with each other and/or integrated with each other. In some embodiments, additional or alternative components and/or configurations are possible.

Aspects of the disclosure relate to communication between electronic devices. Handling of information included in this communication should meet or exceed privacy practices according to their relevant industry and/or government regulations. In some embodiments, sharing of personal information can be blocked and/or prevented without departing from the scope of the disclosure. For example, users may opt out of sharing personal information when allowing devices to communicate and/or authentication modalities other than communication between devices can be used.

Some embodiments are directed to a non-transitory computer readable storage medium storing instructions, which when executed by an electronic device that includes memory and one or more processors coupled to the memory, cause the electronic device to perform one or more method(s), process(es), and/or step(s) described herein.

The invention claimed is:

1. An electronic device comprising:
memory; and
one or more processors coupled to the memory, the one or more processors configured to:
   while operating in a first mode:
      process sensor data based on first data associated with a first user account;
      receive, via one or more input devices in communication with the electronic device including a wearable component, an input corresponding to a request to enter a second mode that includes restricting access to one or more features of the electronic device accessible in the first mode; and
   in response to receiving the input corresponding to the request to enter the second mode:
      in accordance with a determination that one or more criteria are satisfied, operate in the second mode including processing the sensor data based on second data associated with a second user account different from the first user account;
   while operating in the second mode:
      detect a doff of the wearable component;
      in response to detecting the doff of the wearable component and in accordance with a determination that one or more criteria are satisfied:
         cease operating in the second mode; and
         delete the processed sensor data based on second data associated with a second user account different from the first user account; and
      in response to detecting the doff of the wearable component and in accordance with a determination that one or more criteria are not satisfied, continue operating in the second mode.

2. The electronic device of claim 1, wherein the one or more criteria include a criterion that is satisfied in response to detecting a don of the wearable component of the electronic device after detecting the doff of the wearable component.

3. The electronic device of claim 1, wherein the one or more processors are further configured to:
   while operating in the second mode:
      receive an input, using the one or more input devices, corresponding to a request to cease operating in the second mode; and
   in response to receiving the input, cease operating in the second mode.

4. The electronic device of claim 1, wherein the one or more processors are further configured to:
   while operating in the first mode, and while displaying one or more user interfaces of one or more first applications:
      display, using a display, an option to allow access to the first applications in the second mode without allowing access to one or more second applications different from the one or more first applications;
      receive, using one or more input devices, an input selecting the option; and
   in response to receiving the input selecting the option, in accordance with the determination that the one or more criteria are satisfied, operate in the second mode including allowing access to the one or more first applications and restricting access to the one or more second applications.

5. The electronic device of claim 1, wherein the one or more processors are further configured to:
  while operating in the first mode:
    display, using a display, an option to cause the electronic device to transmit a representation of content displayed by the electronic device during the second mode to a display external to the electronic device;
    receive, using one or more input devices, an input selecting the option; and
  in response to receiving the input selecting the option, transmit, while operating the electronic device in the second mode, the representation of the content displayed by the electronic device to the display external to the electronic device.

6. The electronic device of claim 1, wherein the one or more processors are further configured to:
  while operating in the first mode, display, using an externally-facing display, an image customized to a user account of the electronic device; and
  while operating in the second mode, display, using the externally-facing display, a generic image different from the image customized to the user account of the electronic device.

7. The electronic device of claim 1, wherein the one or more processors are further configured to:
  in response to receiving the input corresponding to the request to enter the second mode and in accordance with a second determination that the one or more criteria are satisfied:
    present a selectable option to operate in the second mode based on second data associated with the second user account; and
    present a selectable option to obtain new sensor data associated with a current user account.

8. The electronic device of claim 1, wherein the one or more criteria include a criterion that is satisfied in response to detecting a don of the wearable component of the electronic device within a predetermined time threshold after detecting the doff of the wearable component.

9. A method comprising:
  while operating in a first mode:
    processing sensor data based on first data associated with a first user account;
    receiving, via one or more input devices in communication with an electronic device including a wearable component, an input corresponding to a request to enter a second mode that includes restricting access to one or more features of the electronic device accessible in the first mode; and
  in response to receiving the input corresponding to the request to enter the second mode:
    in accordance with a determination that one or more criteria are satisfied, operating in the second mode including processing the sensor data based on second data associated with a second user account different from the first user account;
    while operating in the second mode:
      detecting a doff of the wearable component;
      in response to detecting the doff of the wearable component and in accordance with a determination that one or more criteria are satisfied:
        ceasing operating in the second mode; and
        deleting the processed sensor data based on second data associated with a second user account different from the first user account; and
      in response to detecting the doff of the wearable component and in accordance with a determination that one or more criteria are not satisfied, continuing operating in the second mode.

10. The method of claim 9, wherein the one or more criteria include a criterion that is satisfied in response to detecting a don of the wearable component of the electronic device after detecting the doff of the wearable component.

11. The method of claim 9, further comprising:
  while operating in the second mode:
    receiving an input, using the one or more input devices, corresponding to a request to cease operating in the second mode; and
  in response to receiving the input, ceasing operating in the second mode.

12. The method of claim 9, further comprising:
  while operating in the first mode, and while displaying one or more user interfaces of one or more first applications:
    displaying, using a display, an option to allow access to the first applications in the second mode without allowing access to one or more second applications different from the one or more first applications;
    receiving, using one or more input devices, an input selecting the option; and
  in response to receiving the input selecting the option, in accordance with the determination that the one or more criteria are satisfied, operating in the second mode including allowing access to the one or more first applications and restricting access to the one or more second applications.

13. The method of claim 9, further comprising:
  while operating in the first mode:
    displaying, using a display, an option to cause the electronic device to transmit a representation of content displayed by the electronic device during the second mode to a display external to the electronic device;
    receiving, using one or more input devices, an input selecting the option; and
  in response to receiving the input selecting the option, transmitting, while operating the electronic device in the second mode, the representation of the content displayed by the electronic device to the display external to the electronic device.

14. The method of claim 9, further comprising:
  while operating in the first mode, displaying, using an externally-facing display, an image customized to a user account of the electronic device; and
  while operating in the second mode, displaying, using the externally-facing display, a generic image different from the image customized to the user account of the electronic device.

15. The method of claim 9, wherein the one or more criteria include a criterion that is satisfied in response to detecting a don of the wearable component of the electronic device within a predetermined time threshold after detecting the doff of the wearable component.

16. A non-transitory computer readable storage medium storing instructions which, when executed by one or more processors of an electronic device, cause the electronic device to perform a method comprising:
  while operating in a first mode:
    processing sensor data based on first data associated with a first user account; and
    receiving, via one or more input devices in communication with the electronic device including a wearable component, an input corresponding to a request to enter a second mode that includes restricting access to one or more features of the electronic device accessible in the first mode; and in response to receiving the input corresponding to the request to enter the second mode:

in accordance with a determination that one or more criteria are satisfied, operating in the second mode including processing the sensor data based on second data associated with a second user account different from the first user account;

while operating in the second mode:

detecting a doff of the wearable component;

in response to detecting the doff of the wearable component and in accordance with a determination that one or more criteria are satisfied:

ceasing operating in the second mode; and deleting the processed sensor data based on second data associated with a second user account different from the first user account; and in response to detecting the doff of the wearable component and in accordance with a determination that one or more criteria are not satisfied, continuing operating in the second mode.

17. The non-transitory computer readable storage medium of claim 16, wherein the one or more criteria include a criterion that is satisfied in response to detecting a don of the wearable component of the electronic device within a predetermined time threshold after detecting the doff of the wearable component.

* * * * *